(12) United States Patent
Schwarze

(10) Patent No.: US 6,843,363 B2
(45) Date of Patent: Jan. 18, 2005

(54) STRIPPING DEVICE FOR THE RETURN RUN AREA OF CONVEYOR BELTS

(75) Inventor: Hans-Otto Schwarze, Esseler Strasse 170, 45665 Recklinghausen (DE)

(73) Assignee: Hans-Otto Schwarze, Recklinghausen (DE)

(*) Notice: Subject to any disclaimer, the term of this patent is extended or adjusted under 35 U.S.C. 154(b) by 0 days.

(21) Appl. No.: 10/621,533

(22) Filed: Jul. 17, 2003

(65) Prior Publication Data

US 2004/0031664 A1 Feb. 19, 2004

Related U.S. Application Data

(60) Provisional application No. 60/436,451, filed on Dec. 27, 2002.

(30) Foreign Application Priority Data

Aug. 14, 2002 (DE) .......................... 102 37 986

(51) Int. Cl.$^7$ ............................... B65G 45/16
(52) U.S. Cl. ...................... 198/497; 198/499
(58) Field of Search ................... 198/497, 499

(56) References Cited

U.S. PATENT DOCUMENTS 3,674,131 A 7/1972 Matson
4,696,389 A * 9/1987 Schwarze .................. 198/499
4,754,868 A * 7/1988 Hughes et al. ............. 198/499
5,016,746 A * 5/1991 Gibbs ......................... 198/499
5,222,589 A * 6/1993 Gordon ...................... 198/497
5,950,803 A 9/1999 Schwarze

FOREIGN PATENT DOCUMENTS

DE 1998 56 338 A1 6/2000
EP 0 481 221 A1 4/1992
EP 0 739303 B1 10/1996

* cited by examiner

*Primary Examiner*—James R. Bidwell
(74) *Attorney, Agent, or Firm*—Bachman & LaPointe (57) ABSTRACT

Apparatus for stripping a belt in conveyor belt assemblies includes a stripping element on a system carrier, the stripping element having a stripping lamella on a lamella holder, the stripping lamella contacting the belt in a peeling position, wherein the stripping element has a swivel mount coupled to the lamella holder and a swivel axis parallel to a plane of the belt, a spring for pressing the stripping lamella against the belt such that the lamella holder in the peeling position is swiveled about the horizontal axis, and when obstructions adhering to the belt impact the stripping lamella, the lamella holder deflects and returns a working position, wherein the stripping lamella is swivel mounted at the lamella holder by a swivel mount having an axis parallel to a plane of the belt and is held and spring biased by a top spring is counter to the bottom swivel mount spring.

27 Claims, 8 Drawing Sheets

STRIPPING DEVICE FOR THE RETURN RUN AREA OF CONVEYOR BELTS

This application claims the benefit of Provisional Application No. 60/436,451 filed Dec. 27, 2002.

BACKGROUND OF THE INVENTION

The present invention relates to a device for stripping dirt off belts in conveyor belt systems in the area of a drive and/or head pulley of the belt.

comprising a system carrier to be attached to a belt carrier frame, at which at least one stripping element is arranged, the stripping element having a stripping lamella mounted on a lamella holder, the stripping lamella contacting the belt in a peeling position, and wherein the stripping element has a bottom swivel mount coupled to the lamella holder and having a horizontal swivel axis—indications such as "horizontal" or the like here and in the following principally refer to the position of use of the stripping element as well as a spring means acting to press the stripping lamella on the lamella holder against the belt in such a form and arrangement that the lamella holder in the stripping position of the stripping lamella is swivelled about the horizontal swivel axis in a spring loaded fashion, and, when obstructions solidly adhering to the belt impact on the stripping lamella, the lamella holder may be easily deflected and returned back to the working position on the belt.

DESCRIPTION OF THE RELATED ART

In a prior art stripping device of this type (EP 0 739 303 B1), the lamella holder has a swivel mount having a limited swivel angle in an arrangement such that the stripping lamella contacting the belt may adapt to changes in inclination of the belt by automatic swivelling. The swivel mount having the spring means acting on the lamella holder consists of a torsion spring joint attached to a plug-in device. In this prior art apparatus, a very good stripping results is achieved which is to be understood as part of a fine cleaning procedure. For cases in which large amount of material adhere to the belt continually or temporarily and have to be stripped off, this stripping device may be overtaxed. In such cases, therefore pre-strippers are arranged upstream capable for stripping great amount of material off the belt.

A stripping device formed as a pre-stripper for the pulley area consists of plastic blocks commonly arranged over the belt width adjacent to each other on a system carrier, the blocks each having stripping edges being able to be swivelled and pressed against the belt for stripping. Due to the elasticity of the plastics material, the blocks can be deflected by obstructions adhering on the belt. The stripping edges of the blocks however are liable to strong wear and tear in particular with high belt velocities. Moreover, the material wear at the stripping edges is very varied so that the stripping edges show an irregular contour and the stripping performance is not uniform.

It is therefore an object of the present invention to provide a device usable in the pulley area of a belt at least as a pre-stripper having a uniform stripping performance and lasting long tool lives even with high belt velocities associated in particular with correspondingly high amounts of material to be stripped off in the pulley area.

SUMMARY OF THE INVENTION

According to the invention, the object is solved in that the stripping lamella is swivel mounted at the lamella holder by a top swivel mount having a horizontal swivel axis and is held by a top spring means in a spring biased fashion whose spring action with respect to the bottom swivel mount and its spring means—is in the counter sense.

A stripping element of the stripping device according to the present invention is characterized in that the lamella holders having the stripping lamella are easily deflected when an obstruction adhering to the belt impacts on the stripping lamella, and may then swivel back to the stripping position on the belt, such as it is the case with the above prior art stripping device. However, the deflection of the stripping lamella according to the invention is achieved according to a new principle wherein the bottom spring loaded swivel mount of the lamella holder now cooperates with a top swivel mount at the lamella holder, namely in a place where the stripping lamella is mounted on the lamella holder, both in the normal stripping operation and when the stripping lamella must give way to an obstruction on the belt.

In normal stripping operation, mainly the bottom swivel mount—by a predetermined biasing force of the spring means acting on the lamella holder—causes uniform contacting of the stripping lamella on the head of the belt. The top swivel mount, in cooperation with the top spring means, holds the stripping lamella in the desired stripping position at a peeling-off angle of the stripping lamella on the belt. Depending on the working conditions, the spring loaded top swivel mount can also contribute to achieve a close contact of the stripping lamella on the belt, essential for a uniformly high stripping performance. Because even small irregularities on the belt would result in short lifting off of the stripping lamella, in particular with higher velocities, sometimes even resulting in longer return times when the return of the stripping lamella into the stripping position on the belt is caused solely by the spring means acting at the bottom.

In an emergency, in particular when a major obstruction on the belt impacts on the stripping lamella, the obstruction not being able to be easily stripped off, both spring loaded swivel mounts come into action and lift the stripping lamella off the belt for a fraction of a second, so that the obstruction may pass the stripping lamella, as will be explained in the following.

When an obstruction fast adhering to the belt, e.g. a so-called belt damage, impacts on the stripping lamella, the stripping lamella may easily leave its stripping position on the belt. The stripping lamella at its stripping edge is engaged by the obstruction, and taken along. This can lead to a swivelling motion about the swivel axis of the top swivel mount, where the spring force and therefore the restoring force of the biased spring means increases. Overlapping with this swivelling motion of the stripping lamella is a counter-sense swivelling motion of the lamella holder about the bottom swivel mount caused by the reaction forces of the belt transmitted by the stripping lamella. This results in a further increase of the spring action of the spring means acting on the bottom swivel mount so that the restoring force is increased here as well. During this swivelling motion, at the time when the distance from the top swivel axis to the belt is increased to a length of the distance between the top swivel axis and the stripping edge or earlier, the stripping lamella starts getting out of engagement with the obstruction, and the obstruction may pass under the stripping lamella.

The sequence of the two overlapping swivel motions is essentially dependent on the mass forces, in particular in the area of the stripping lamella and the top swivel mount, including the spring means acting there and on the torques resulting therefrom. The smaller the mass of these components, i.e. the components at the head of the lamella holder, the more quickly and in particular the more easily the stripping lamella can react to impacting obstructions, i.e. back away.

In particular with fast moving belts and great mass forces as well as depending on the seize of the obstruction adhering to the belt, the swivelling off about the bottom swivel mount of the lamella holder caused by the impact of the obstruction on the stripping lamella may still just last, or the return of the lamella holder may just have begun, when the counter-sense swivel motion of the stripping lamella about the top swivel mount, which essentially depends on the belt velocity, has already taken place, or is about to be completed. In this way the return of the stripping lamella to its working position at the lamella holder may be effected so quickly that the stripping lamella is not placed onto the belt starting with the stripping edge, but immediately with its angled stripping surface. This contributes to belt saving and to a greatest possible shortening of the interruption of the stripping operation, even if the duration of the interruption is only in the range of milliseconds.

Due to the structure of the stripping lamella of the invention and its effect in normal stripping operation as well as in an emergency when obstructions such as belt damage occur, a cleaning performance unusual for a pre-stripper is achieved.

When using a suitable geometry on the stripping element of the invention, as will be explained later, after assembling the stripping device up to the final wear of the stripping lamellae, no readjusting is necessary, i.e. the pressure of the stripping lamella acting on the belt remains nearly constant. This means that the stripping device of the present invention is made nearly maintenance-free.

In addition to a relatively high and uniform stripping performance, the stripping device of the present invention also has the advantage of the best possible belt saving, because the stripping lamellae may easily back away from belt damage or the like by the cooperation of the two spring-loaded swivel mounts. For this reason, the invention also allows the use of stripping lamellae of highly wear resistant material, such as hardened steel, ceramics or the like having corresponding shape retention, and—as seen in the width of the belt—uniform as well as regular stripping performance.

The spring means acting together with the bottom swivel mount on the lamella holder, can be a mechanical spring, such as a tension or compression spring, or even a hydraulic spring means or the like. According to a further development of the invention, a torsion spring is preferred, which is associated with both the bottom and the top swivel mount or only with one of them (claim 2).

Suitably, the top and/or bottom swivel mount is configured to be a torsion spring bearing, in particular, a rubber torsion spring bearing (claim 3), because this combination of a swivel mount and a torsion spring has proven suitable with stripping devices for belts due to the ruggedness and long service life of such torsion spring bearings as well as because of the their compact design.

For stripping devices of the present invention, torsion spring bearings having a relatively great angle of deflection are preferred for both the top and the bottom swivel mount because the top swivel mount should be in the closest possible position to the belt so that the swivelling motion of the stripping lamella is subjected to the smallest possible mass moments of inertia. Also for the bottom swivel mount, the greatest possible angle of deflection of the torsion spring is preferred.

In order to stay with the well proven principle of the use of torsion spring bearings and still to achieve the greatest possible angle of deflection, it is provided according to an alternative embodiment of the present invention for the torsion spring bearing, which consists of an internal square element and a corresponding internally square-shaped housing having spring elements of rubber or the like in the four corner areas formed by the internal square element and the housing, for increasing the maximum angle of deflection, to consist of at least two individual springs coupled in series so that the overall resulting angle of deflection of the torsion spring bearing corresponds to the sum of the angles of deflection of the individual torsion springs (claim 4).

Particular suitability for the use with the stripping device of the present invention is shown by a torsion spring bearing, wherein from three individual torsion springs configured to be side by side on a continuous internal square rod having separate housings and spring elements, a double spring, i.e. a torsion spring having a double angle of deflection is formed, wherein the two lateral housings are coupled in a torsion resistant manner and form one end of the double spring while the middle housing is the other end of the double spring (claim 5).

The above-mentioned double spring is preferably structured and used with the stripping device of the present invention in such a way that one arm of the lamella holder used to form a link between the bottom and the top torsion spring bearing, is attached at its top end to the middle housing of the top torsion spring bearing configured as a double spring and at its bottom end to the middle housing of the bottom torsion spring bearing configured as a double spring, while the two lateral housings are each commonly attached to a lamella plate (top torsion bearing) and to a foot (bottom torsion bearing) of the stripping element (claim 6). Please note that this arrangement may also be reversed, i.e.—depending on structural requirements—that the arm of the lamella holder may also be coupled with the top and/or bottom of the lateral housing of the torsion spring.

Such a torsion spring bearing may be used for the bottom and/or the top torsion spring bearing and may easily structurally assembled, where the advantages of the rubber torsion spring well known per se are used, wherein however due to the configuration as a double spring, a doubling of the maximum spring excursion is achieved. In this way, double the angle of deflection is available for the torsion spring bearing. The double spring also has the advantage that the spring force change per angle of deflection is smaller than when the maximum spring force is effective, even within a relatively small deflection angle range and the changes of the spring force per rotary angle unit are correspondingly great. From this, for the function of the stripping element of the present invention, the advantage arises, that in all circumstances, a sufficient bias is achieved for generating the pressure force for the stripping lamella. Mainly, however, a nearly constant pressure force is achieved over the wear angle, i.e. in the area of the angle of deflection which is travelled by the lamella holder until complete wear has been reached.

Preferably, the effective line of the stripping edge of the stripping lamella in the stripping position of the stripping lamella at the belt extends in the bottom 90° sector between the horizontal and the vertical centre plane of the contact angle of the belt at the pulley—in particular, however, in the so-called three o'clock position (claim 7).

The arrangement of the effective line is therefore preferably in an area immediately downstream—as seen in the running direction of the belt—of the ejection point for the conveyor material. In this way, the stripping device retains good accessibility, while the space beneath the neighbouring sector is left free for other purposes. Moreover, the material stripped off the belt, is kept in the vicinity of the collection position for the conveyor material. Overall, the arrangement of the effective line in the so-called three o'clock position has been well proven in practice.

The principle according to the present invention of the peeling-off stripping position of the stripping lamella at the belt and the quick deflection of the stripping lamella on the impact of obstructions may, however, be chosen in the entire angular range of the angle of contact, i.e. at the top 90° segment and even beyond the bottom 90° segment if there is a need to do this. This wide range allows, if necessary, for two or more stripping devices to be arranged in series at the head of the belt.

Herein the rotary axis of the bottom swivel mount is preferably in a position on a circular line about the pulley axis and correspondingly following the position of the top swivel mount is also on such a circular line. As an inner circle, this is suitably situated between the belt curve and the outer circle defined by the possible positions of the bottom swivel mount.

For the peeling-off arrangement of the stripping lamella at the belt enabled according to the present invention, according to a further development of the present invention, it is preferred that the attack angle of the stripping lamella in its peeling-off stripping position at the belt be in the angle range of between about 40° and about 80° against the tangent to the radius of the angle of contact of the belt at the pulley in the point of the effective line of the stripping edge of the stripping lamella, in particular, however, is about 60° (claim 8). An attack angle in this area causes a high stripping performance and, at the same time, it allows quick deflection of the stripping lamella when a belt damage or the like impacts on the stripping lamella.

In particular in the three o'clock position, the effective line of the stripping edge of the stripping lamella, but also for lower positions of the effective line, it is advantageous for the axis of the bottom swivel mount on the pulley side of the tangent to the radius of the angle of contact of the belt at the pulley to be in the point of the effective line of the stripping edge of the stripping lamella, and for the axis of the top swivel mount to be on the side of the tangent facing away from the pulley (claim 9). In this way, the lamella holder comes into a position near the belt where, on impact of an obstruction onto the stripping lamella, the lamella holder can react quickly and back off. For this purpose, the axis of the bottom swivel mount preferably is on or close to the tangent (claim 10).

For the functioning of the top swivel mount, a relatively long arm of the lamella holder which is to allow easy deflection of the stripping lamella on impact of an obstruction, has proven advantageous. Therefore, according to a further development of the present invention, the distance between the top and the bottom swivel mounts must be chosen sufficiently great that the angle for the biasing amount of the spring means associated with the bottom swivel mount and the angle for the deflection path of the lamella holder about the bottom swivel axis with obstructions impacting on the stripping lamella are together in the range of between 40° and 80°, however together preferably about 65° (claim 11).

When assembling the stripping device according to the present invention, suitably first the stripping lamella is adjusted in the desired position against the lamella holder. This is why it is preferred according to the invention for the stripping position of the stripping lamella to be adjusted having the desired attack angle of the stripping lamella on the lamella holder and having the right bias of the associated spring means and is fixed by means of an adjustable screw or a spacer or the like (claim 12).

When adjusting the desired position of lamella holder against the belt, a corresponding adjustment of the position of the lamella holder is to be carried out. To do this, suitably the biasing force of the spring means associated with the bottom swivel mount is adjusted by suitably swivelling the lamella holder about the necessary biasing amount and fixing of the lamella holder in the biased position, e.g. by means of a particularly adjustable screw or by means of a spacer (claim 13). After this individual adjustment of the lamella holder and the stripping element, respectively, the system carrier is approached to the belt until the stripping edge of the stripping lamella has reached its predetermined stripping position and effective line, respectively. Then the screw may be released and turned back, respectively, so that the spring force will be effective and the stripping lamella is correspondingly pressed against the belt.

Alternatively, according to a further development of the present invention, it is provided for the setting of the stripping lamellae in the stripping position at the belt to be carried out by accordingly swivelling the lamella holder of the stripping elements about the bottom swivel mount accompanied by biasing the associated spring means by adjusting the system carrier (claim 14). For adjusting the system carrier, a number of various systems may be envisaged, explained in the following.

First, the adjustment and biasing of the lamella holders may be carried out by shifting the system carrier (claim 15). After shifting, i.e. when the lamella holders have reached their predetermined position and therefore the stripping edges of the stripping lamellae have reached their stripping position and their effective line at the belt, respectively, the system carrier is preferably fixed. It is also possible to let the force required for reaching this position continue to be effective, e.g. by means of a spring force or the like.

Advantageously, shifting of the system carrier in a horizontal direction in the case of an effective line of the stripping edge is in particular in the three o'clock position (claim 16). An arrangement of the system carrier below the effective line of the stripping lamella is a prerequisite for all arrangements.

According to a first alternative, it is possible for the system carrier to be carried at both ends directly in horizontally shifting bearings (claim 17). According to a second alternative (claim 18) the system carrier is attached to rigid supports at both ends, each supported by bearings arranged centrally in the area or in the height of the horizontal axis of the pulley and in horizontally shifting bearings. According to a third alternative (claim 19) it is provided for the system carrier to be attached to rigid supports at both ends, the supports being horizontally shiftable by means of bearings each above the horizontal axis of the pulley at both ends of the system carrier.

Instead of shifting the system carrier for adjusting the stripping elements or the lamella holders, an adjustment is also possible by rotating the system carrier. Herein it is preferred for the system carrier to be arranged in an area below the effective line of the stripping lamella and for the adjustment of the system carrier to be done by rotating or swivelling of the same by having a torque act on the system carrier itself or on its swivelling bearing (claim 20). The torque may be generated pneumatically, hydraulically or mechanically by means of tension, pressure or torsion springs or by weight forces or the like (claim 21).

According to a first alternative, the torque is generated coaxially between the system carrier and the lateral bearings of the same (claim 22). According to a second alternative having two possibilities, the torque is generated in bearings below or above the horizontal centre axis of the pulley and each at a distance to this axis, at both ends of the system carrier, and the torque causes, via rigid lateral supports carrying the system carrier, a swivel movement of the same (claim 23).

BRIEF DESCRIPTION OF THE DRAWINGS

Exemplary embodiments of the present invention will be explained in the following in more detail with reference to the drawings, wherein.

DETAILED DESCRIPTION

Figure 1:
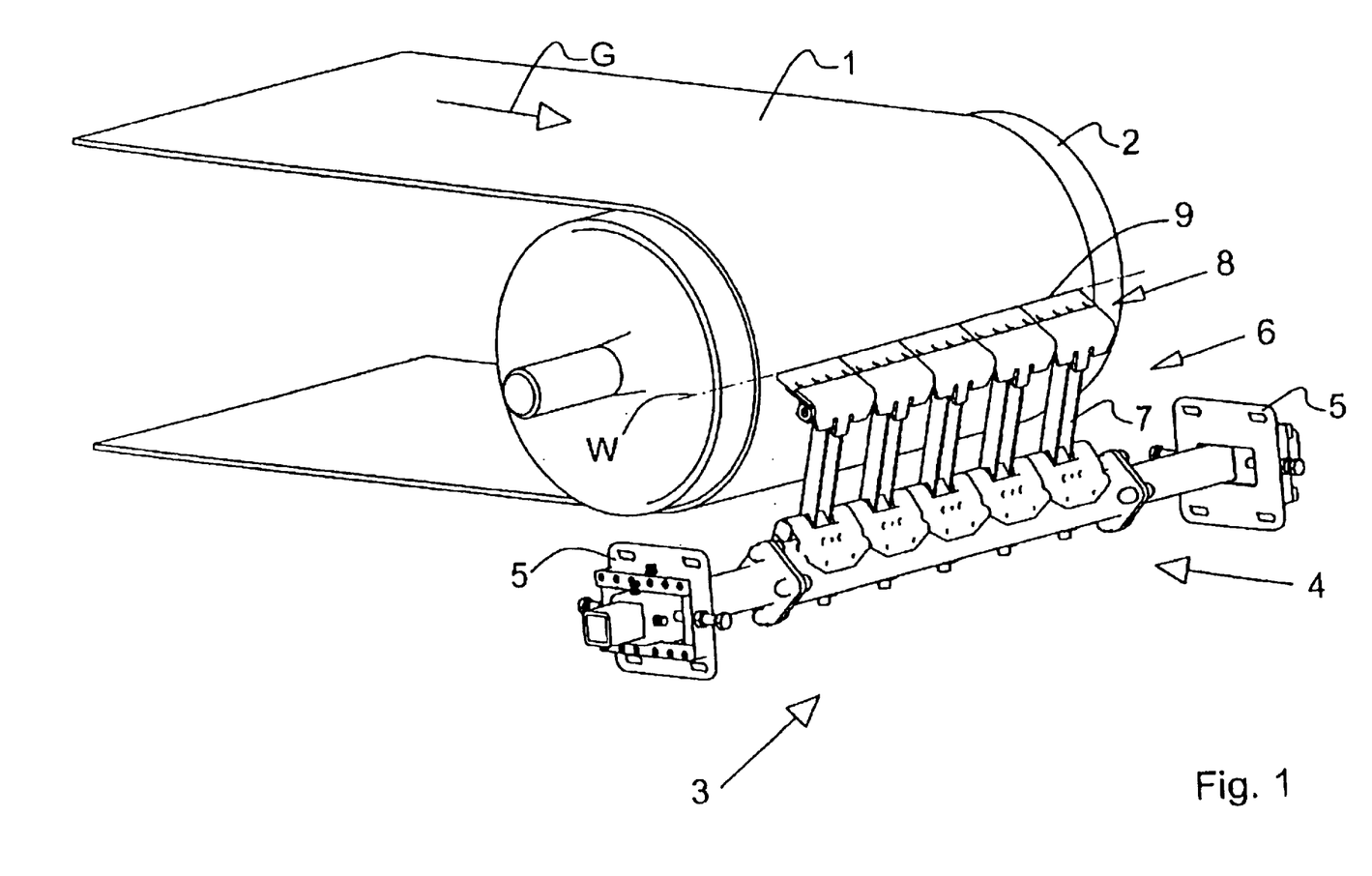
FIG. 1 is a perspective view of a pulley of a conveyor belt assembly having a belt wrapped around the pulley and having a stripping device having stripping elements contacting the belt in the so-called three o'clock position of the angle of contact of the belt on the pulley.

With reference to FIG. 1, about a pulley 2—drive and/or head pulley—a belt 1 is placed running round the pulley 2 in a belt running direction indicated by an arrow G, in this case having an angle of contact of about 90°. The pulley 2 is supported in the usual way to be rotary within a frame (not shown) of a conveyor belt assembly.

At the head of the belt 1, as a pre-stripper, a means 3 is arranged for stripping dirt off the belt 1. On a system carrier 4 supported by means of lateral supports 5 at both its ends in a frame (not shown) of the conveyor belt assembly, there are five stripping elements 6 in a row immediately adjacent to each other. Each stripping element 6 is mounted on the system carrier 4 by way of a lamella holder 7 and carries a stripping lamella 8 on top (indications like "top" or "horizontal" or the like here and in the following principally refer to the position of use of the stripping element 6) the stripping lamella 8 in the stripping operation closely contacting the belt 1 by its stripping edge 9 in the so-called three o'clock position along an effective line W shown as a dash-dotted line.

Figure 2:
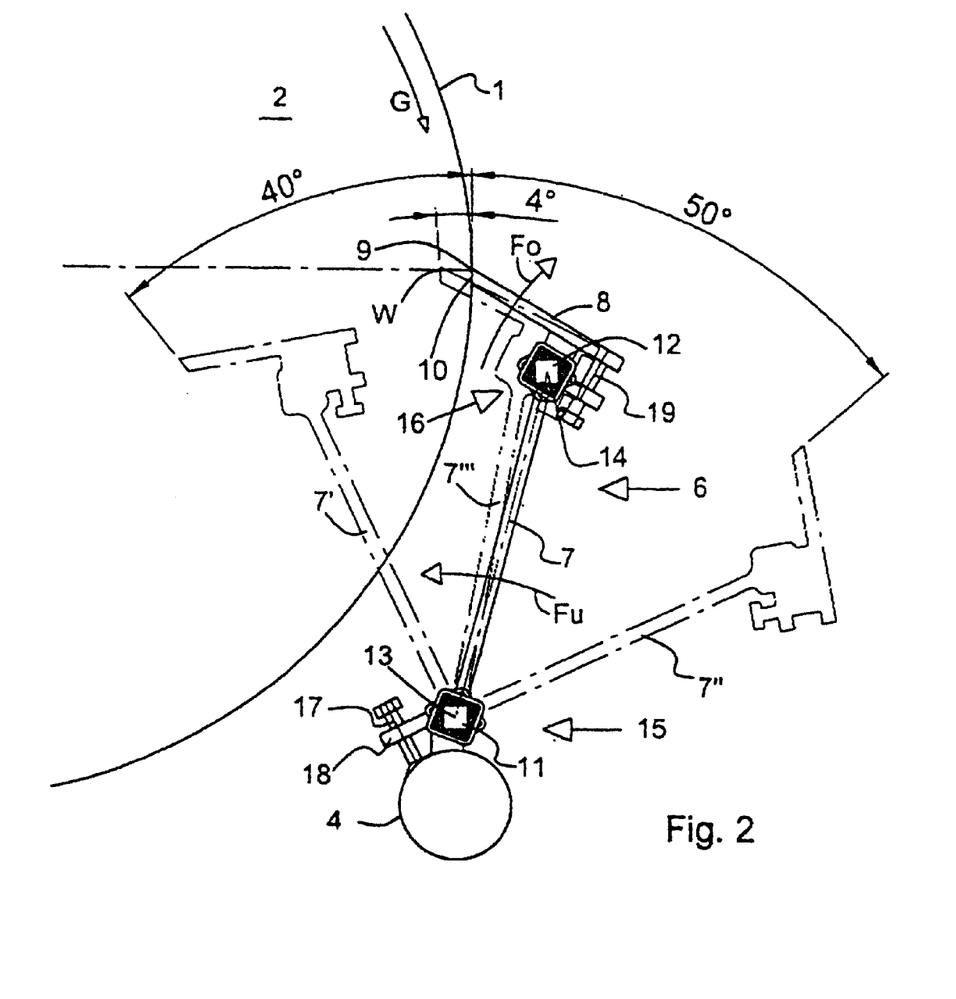
FIG. 2 shows a schematic side view of a segment of the angle of contact of the belt on the pulley having a stripping element whose stripping lamella contacts the head of the belt in the so-called three o'clock position.

In FIG. 2 the stripping lamella 8 also has its stripping edge 9 as well as its stripping surface 10 closely contact the belt 1 along the effective line W forming an angle of about 60° with respect to the tangent to the radius of the angle of contact of the belt 1 at the pulley 2. This contact is achieved by a spring force Fu, with which the lamella holder 7 presses the stripping lamella 8 against the belt 1 about a horizontal rotary axis 13 of a bottom swivel mount 11. In the exemplary embodiment chosen here, the bottom swivel mount 11 consists of a bottom torsion spring bearing 15, whose structure will be explained with reference to FIGS. 5 to 9. The torsion spring bearing 15 is coupled to the system carrier 4.

For achieving a spring force Fu with which the stripping edge 8 is pressed with sufficient tension against the belt 1 via the lamella holder 7, the lamella holder 7 is biased by 40° from the neutral position of the bottom torsion spring bearing 15, in which the lamella holder is indicated as 7', for pressing the stripping lamella 8 against the belt 1, until the lamella holder 7 actually takes up the position at the bottom torsion spring bearing 15 as shown in FIG. 2 and the spring force Fu may become effective in order to initiate and maintain a close contact of the stripping lamella 8 at the belt 1. According to a first alternative, as will be explained below, the biasing of the bottom torsion spring bearing 15 is carried out individually at each stripping element 6 in an area having a certain distance from the belt 1. After biasing the bottom torsion spring bearing 15, the lamella holder 7 is fixed in this position, and the system carrier 4 may be brought into the position shown for pressing the stripping lamella 8 against the belt 1. The fixing of the lamella holder 7 is now released so that the spring force Fu becomes fully effective and causes the necessary contact pressure of the stripping lamella 8. The stripping position shown causes that dirt adhering to the belt is peeled off by the stripping lamella 8 having its stripping edge 9 and can then be carried off. According to a second alternative, the biasing of the lamella holders 7 of the row of stripping elements 6 and the adjustment of the stripping lamellae 8 is carried out by approaching the system carrier 4 together with the stripping elements 6 against the belt 1 and by pressing the same with the system carrier 4 to the belt 1 until the stripping lamellae 8 have reached the stripping position on the effective line W.

Although stripping lamellae 8 of highly wear resistant material such as hardened metal, ceramics or the like are used, the stripping lamella 8 in the area of its stripping edge 9 or its stripping surface 10 is subjected to high stresses and, in the course of time, is subjected to wear causing material wastage at the stripping surface 10 of the stripping lamella 8. Due to the shortening of the stripping lamella 8, the rotary angle of the lamella holder 7 is changed slightly and eventually reaches the position indicated as 7''', differing from the original biasing angle by 4°. The maximum wear path or wear angle of the lamella holder 7 is limited by a limit screw 17 having a stop 18 mounted on the system carrier 4. Due to very small change in the rotary angle the spring force Fu is only very slightly reduced and remains largely constant. This advantage can be explained from the geometry shown and from the type of the bottom torsion spring bearing 15, as will be explained below.

The stripping element 6, however, may also carry out a backing-off movement in a clockwise direction, as will be explained with reference to FIG. 3, which may easily be a rotary angle of 50°, as indicated in FIG. 2, and may lead to a corresponding increase in the spring force Fu, if in this situation the lamella holder 7 takes up the position shown as 7″ in FIG. 2. Such a situation can arise when an obstruction H adhering fast to the belt 1, such as a belt damage or the like, impacts on the stripping surface 8.

Figure 3:
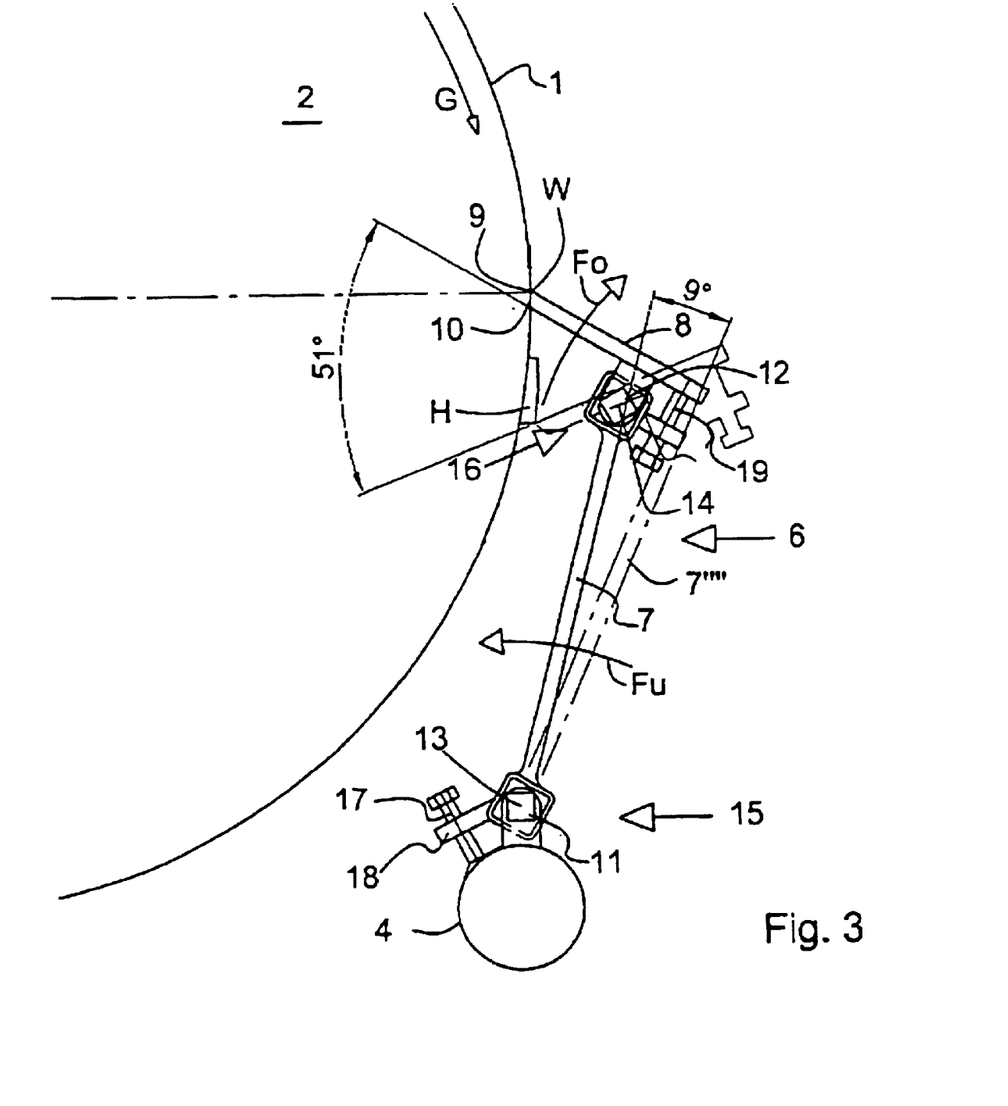
FIG. 3 shows a side view similar to the stripping element of FIG. 2 in the stripping position, but additionally showing the stripping lamella in the swivelled-off position after the impact on the stripping lamella of an obstruction adhering fast to the belt.

FIGS. 2 and 3 show that the stripping lamella 8 is mounted at the top end of the lamella holder 7 via a spring loaded top swivel mount 12 having a horizontal rotary axis 14. For the present exemplary embodiment, for the spring loaded top swivel mount 12, a torsion spring bearing 16 of a similar type as for the bottom torsion spring bearing 15 has been chosen. The torsion spring of the top torsion spring bearing 16 is biased in such a way that a spring force Fo results as shown acting in a clockwise direction as well as in a counter-sense to the bottom spring force Fu, the force Fo being fixed with a adjustment screw 19 in order to hold the stripping lamella 8 in the stripping position shown.

When an obstruction H fast adhering to the belt 1 (cf. FIG. 3), e.g. a so-called belt damage or the like, impacts on the stripping lamella 8, both spring loaded swivel mounts 11, 12 come into action and get the stripping lamella 8 out of engagement with the belt 1 for a fraction of a second so that the obstruction H may pass under the stripping lamella 8 as will be explained below.

The stripping lamella 8 is engaged by the obstruction H at its stripping edge 9 and taken along. It is swivelled about the swivel axis 14 of the top torsion spring bearing 16 in a counter-clockwise direction, wherein the spring force Fo and therefore the restoring force of the biased torsion spring of the top torsion spring bearing 16 increases. This swivelling motion of the stripping lamella 8 is overlapped with a counter-sense swivelling motion of the lamella holder 7 about the bottom torsion spring bearing 15 by the reaction forces of the belt 1 transmitted by stripping lamella 8. Herein, the spring tension of the bottom torsion spring bearing 15 is further increased so that the restoring force is increased here as well. When during this counter-sense swivelling motion of the lamella holder 7 and the stripping lamella 8, the distance from the top swivel axis 14 to the belt 1 becomes as long as the distance between the top swivel axis 14 and the stripping edge 9—additionally, the size of the obstruction H is to be taken into account—the stripping lamella can be disengaged from the obstruction H as shown in FIG. 3, and the obstruction H may pass under the stripping lamella 8. In the present exemplary embodiment, the obstruction H can pass at the time when the stripping lamella 8 has a swivel angle of 51° less against the top spring force Fo and the counter-sense backing-off swivel motion of the lamella holder 7 has reached a swivel angle of 9° and is in the position indicated as 7‴.

In the introductory portion of the description it has been mentioned already that the backing-off motion and also the return of the stripping lamella 8 into the stripping position is the quicker, the smaller the mass of the components at the head of the lamella holder 7. The aim is for the stripping lamella 8 to have already returned to its attack angle position before the return of the lamella holder 7 has occurred. In this way, the return of the stripping lamella 8 into its working position at the lamella holder 7 may be carried out in such a way that the stripping lamella 8 does not contact the belt 1 starting with its stripping edge 9 but already with its stripping surface 10. This is to achieve the greatest possible saving of the belt and also the greatest possible shortening of the interruption of the stripping operation.

Figure 4:
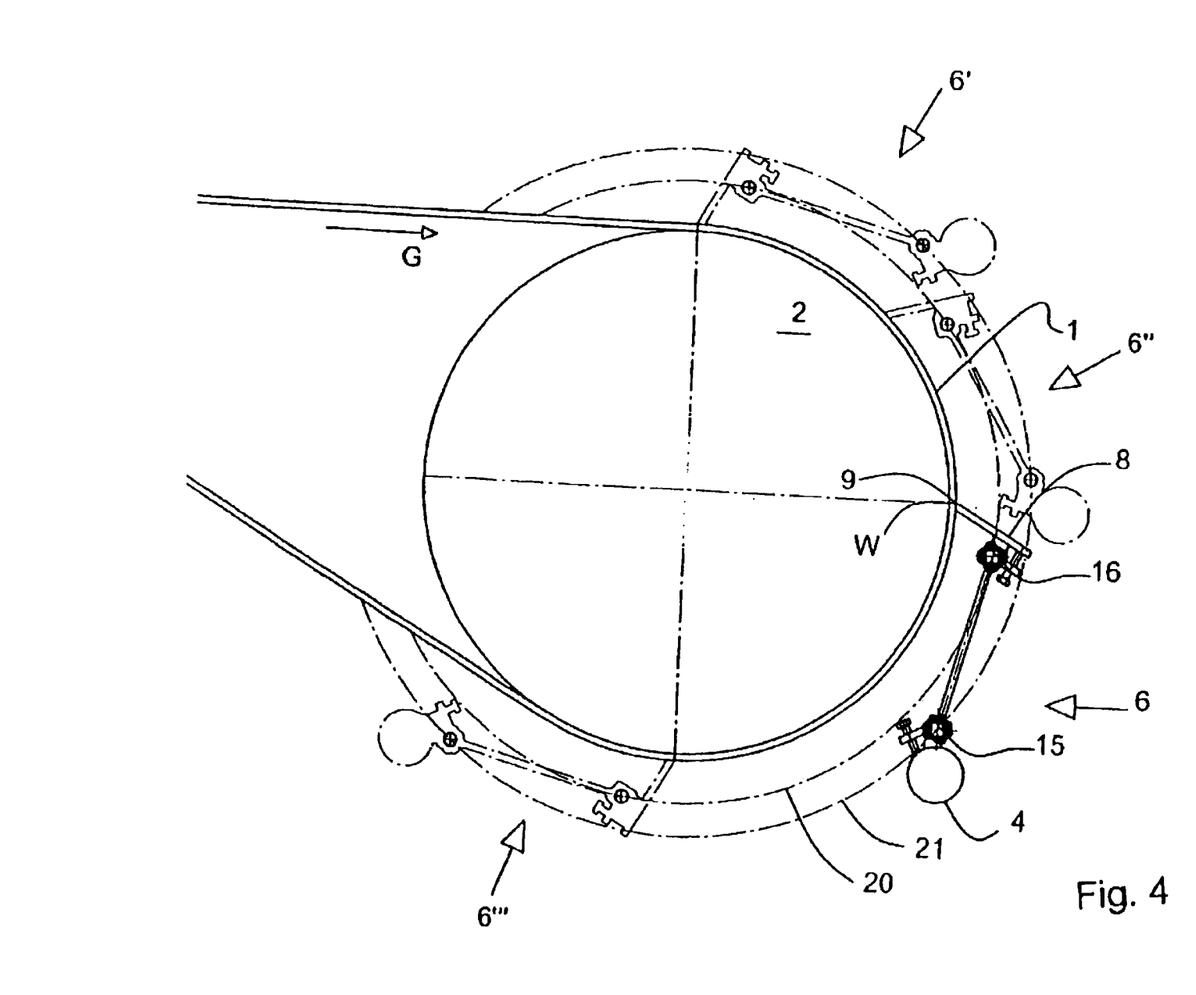
FIG. 4 shows a schematic side view of the pulley and the belt for showing possible arrangements of the stripping elements at the pulley circumference.

With reference to FIG. 4, possible arrangements of a stripping device of the present invention are shown at the pulley circumference. It turns out that the above-described effect of a stripping device according to the invention is not at all limited to the three o'clock position of the stripping lamella 8 at the belt 1, but that the angle portions of both the top and the bottom 90° segment of the contact angle of the belt 1 may be envisaged for the stripping position of the stripping lamella 8, and that there is even the possibility of a stripping position of the stripping lamella 8 beyond the bottom 90° segment when the contact angle of the belt 1 is greater than 90° and there is a need for a stripping position of the stripping device that is so far receded. This wide angular area for possible stripping positions if necessary allows for two or more stripping devices to be arranged one after the other at the head of the belt 1 as is illustrated in FIG. 4 by the representation of three further stripping devices in various positions at the pulley circumference, indicated as 6′, 6″ and 6‴ and shown in dot-dash lines. Each swivel axis of the bottom torsion spring bearing 15 is on an outer circle 21 and each swivel axis of the top torsion spring bearing 16 on an inner circle 20 about the pulley axis.

With reference to FIGS. 5 to 9 an exemplary embodiment of a novel torsion spring bearing principle is shown for the torsion spring bearings 15, 16, the principle being explained in the following with reference to the bottom torsion spring bearing 15.

Figure 6:
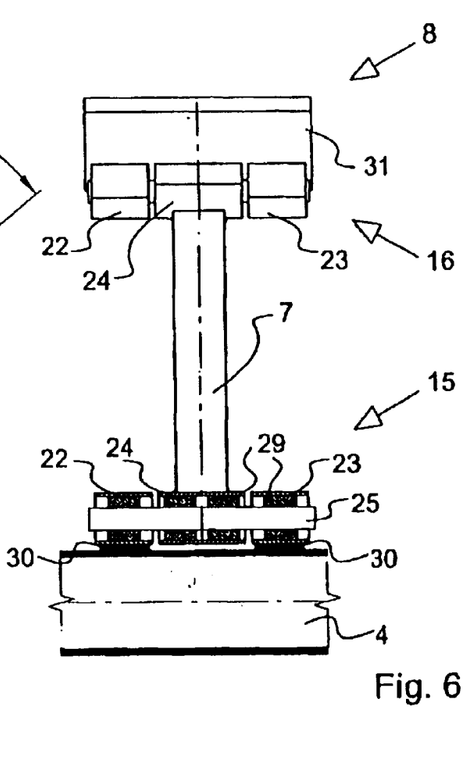
FIG. 6 is a front view of the stripping element of FIG. 5 in a sectional view along line C–D of FIG. 5.
Figure 7:
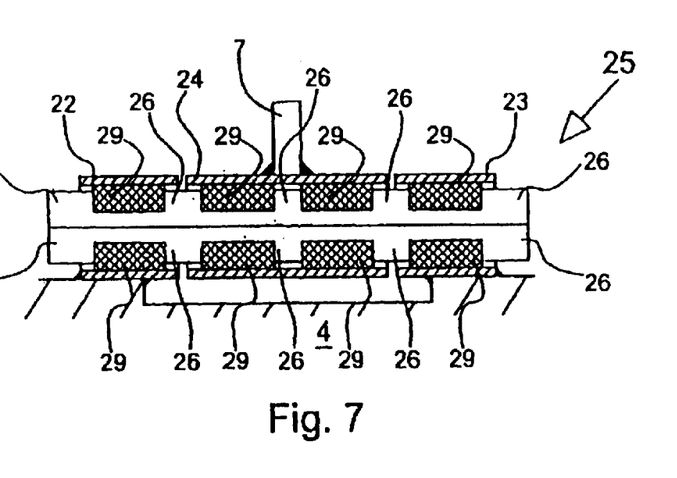
FIG. 7 is a sectional view complementary to the one shown in FIG. 6 for illustrating the structure of a double torsion spring according to a further development of the present invention.
Figure 8:
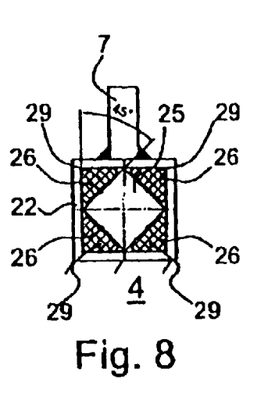
FIG. 8 is a side view with reference to FIG. 7 in a quiescent position of the torsion spring shown.
Figure 9:
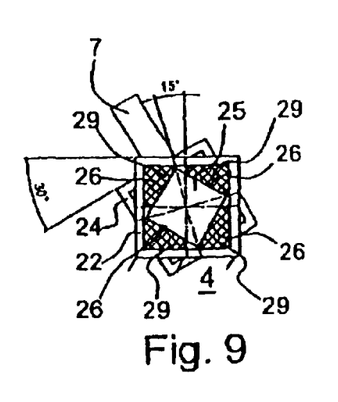
FIG. 9 is a side view with reference to FIG. 7, like FIG. 8, but showing a deflection of the housing of the centrally arranged torsion spring and a partial rotation of the rubber torsion spring element arrangement of the outer housing shown as well as of the continuous internal square element of the three housings.

From FIG. 6 in combination with FIGS. 7 to 9 it can be seen that for forming a so-called double torsion spring, a left lateral housing 22 and a right lateral housing 23 are each fixedly attached to a square internal square rod (the exterior design of the housings is irrelevant) via an attachment 30 to a system carrier 4 (purely schematically shown in FIGS. 7 to 9). Between the two lateral housings 22, 23, in alignment with that latter, a central housing 24 is arranged having in particular the same cross section as the lateral housings 22, 23. An internal square rod 25 extents through the three housings 22, 23, 24. Between the four side surfaces 26 of the internal square rod 25 and the inner surfaces of the housings 22, 23, 24, as shown in the drawings, four spring elements 29, preferably of rubber, are arranged in a pressurized state. In the central housing 24, there are two groups of four spring elements 29 in a side-by-side configuration, so that the overall arrangement comprises four groups.

Rubber torsion spring elements having an interior square rod and a housing configured to have a square shape at least on the inside and having rubber spring elements in the corner areas are well known, in particular also in their application with stripping devices for belts. However, the arrangement and coupling described here of the two lateral housings 22, 23 and separate therefrom the central housing 24 together on the internal square rod 25 results in a torsion spring bearing 15 in which the two outside torsion springs in the lateral housings 22, 23 are fixedly coupled with each other, in the present case via the system carrier 4, while the central torsion spring in the central housing 24 is freely rotatable with respect to the lateral housings 22, 23. Since the internal square rod 25 is not supported but freely floating and only held by the spring elements 29, the internal square rod 25 may be rotated with respect to all three housings. If for example the lamella holder 7 (only shown schematically in FIG. 7) attached on the outside of the central housing 24 (cf. FIG. 6) is rotated by 30°, the internal square rod 25 is only rotated by 15°. The biasing of the torsion spring also corresponds to a bias of 15°. By the arrangement shown, consequently the angular path of the lamella holder 7 is doubled with respect to the torsion spring deflection, as illustrated in FIG. 9. The lateral housings 23 and the central housing 24 show a corresponding angular offset with respect to each other in the biased position of the lamella holder 7 of FIG. 5.

Figure 5:
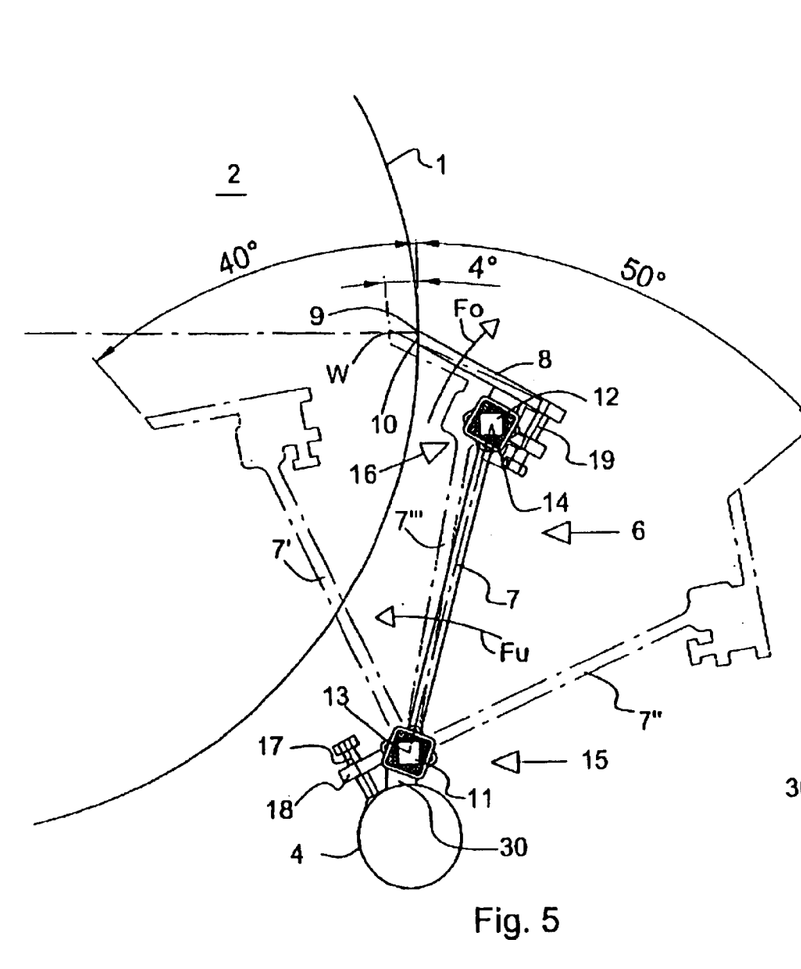
FIG. 5 shows a similar schematic side view of a stripping element as in FIG. 2, but having torsion springs for each of a bottom and a top swivel mount of the stripping element, in particular for illustrating the torsion spring bearings used and the great angles of deflection for the lamella holder of the stripping element that are thus possible.

From FIGS. 5 and 6 it can be seen that the configuration of the bottom torsion spring bearing 15 and the top torsion spring bearing 16—the lamella holder 7 being attached between the two—are the same in their structure and effect. In either case great deflection angles are enabled by the double spring configuration. As can also be seen from FIG. 7, the two lateral housings 22, 23 are fixedly attached to a lamella plate 31 and therefore to each other, while the freely rotatable central housing 24 of the central torsion spring is fixedly attached to the lamella holder 7.

For mounting the system carrier 4 on the frame of the conveyor belt assembly and for adjusting the stripping elements 6 supported on the system carrier 4 at the belt 1, there are several possibilities that will be explained with reference to FIGS. 10 to 15 in combination with FIGS. 1 to 3 and are to be construed to be purely exemplary.

First the stripping lamella 8 is adjusted in the desired stripping position by rotating and biasing the top torsion spring bearing 16 and is fixed in this position (individual adjustment).

Then the desired position of the lamella holder 7 with respect to the belt 1 is adjusted. To do this the bottom torsion spring bearing 15 is adjusted or prepared by suitably swivelling the lamella holder 7 by the necessary biasing amount (cf. FIGS. 2 and 5) and by fixing the lamella holder 7 in the biased position, e.g. by means of an adjustable screw of by means of a spacer. After this adjustment of the lamella holder 7, the system carrier 4 is approached to the belt 1 until the stripping edge 9 of the stripping lamella 8 has reached its predetermined stripping position or effective line W. Then the screw can be released or turned back, so that the spring force of the lamella holder 7 may become effective and the stripping element 8 is pressed to the belt 1, e.g. in the three o'clock position as shown in the exemplary embodiments.

Instead of the individual biasing of the lamella holder 7 or the bottom torsion spring bearing 15, this adjustment, according to the above-mentioned second alternative, may also be carried out for the entire row of stripping elements 6 commonly by approaching and pressing against the belt 1 by means of the system carrier 4.

Figure 10:
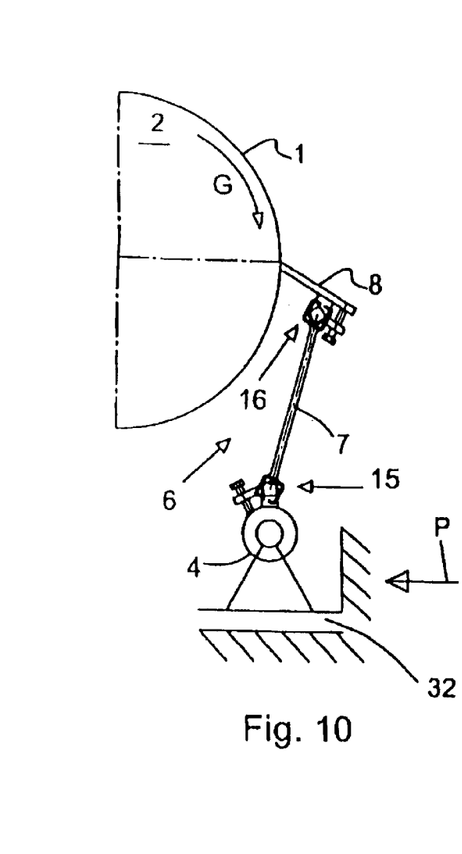
FIG. 10 shows a schematic side view of a stripping element in the three o'clock position at the head of a belt on a system carrier having a shifting support of the same below the pulley.
Figure 11:
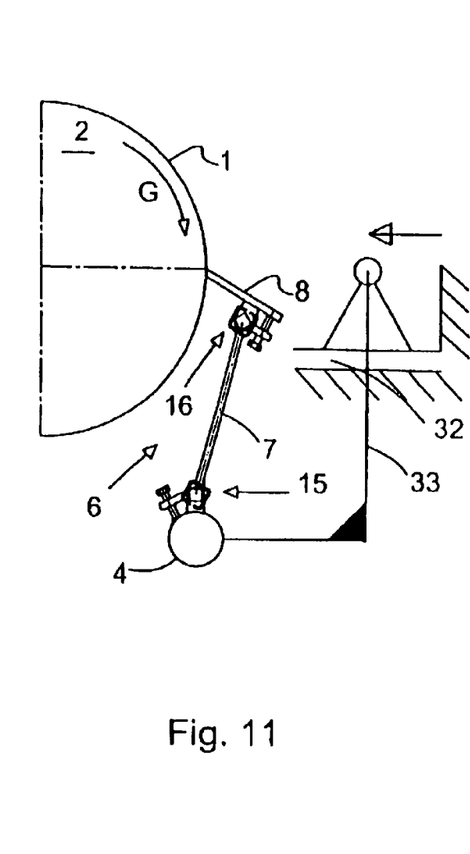
FIG. 11 is a side view similar to the one of FIG. 10, however showing a centrally shifting support of the system carrier via a rigid support as well as having a shifting plane below the horizontal pulley central plane.
Figure 12:
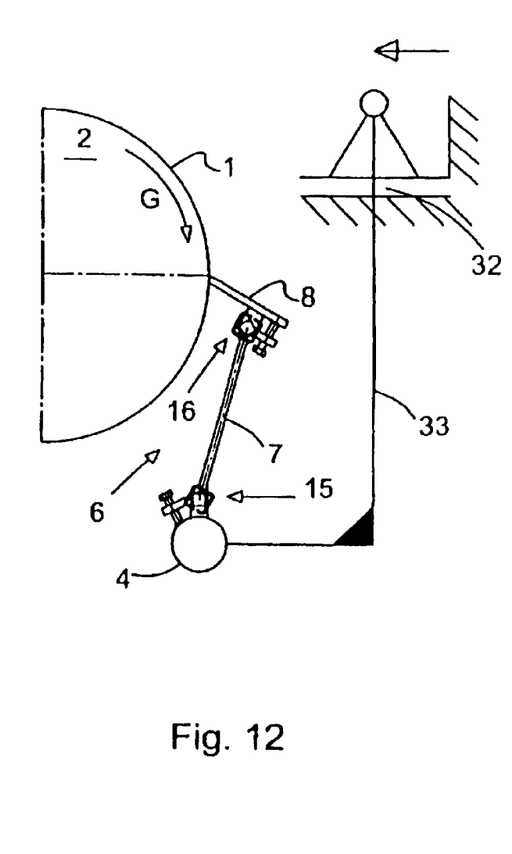
FIG. 12 is a view similar to the one shown in FIG. 11, however having a shifting plane for the system carrier above the horizontal pulley central plane.

The approaching of the system carrier 4 to the pulley 2 for pressing (against the belt 1) the stripping lamellae 8 of the stripping elements 6 on the system carrier may be done in various ways. The setting of the stripping lamellae 8 of the stripping elements 6 may be done by sliding the system carrier 4 by means of a horizontally sliding support 32 in the direction of arrow P below the pulley 2, as shown in FIG. 10. FIG. 11 shows that a central support of the system carrier 4 for setting the stripping lamellae 8 in the three o'clock position is also possible by means of a rigid support 33. Herein the horizontal plane of the bearings 32 may also be above the horizontal axis 34 of the pulley 2, as shown in FIG. 12.

Figure 13:
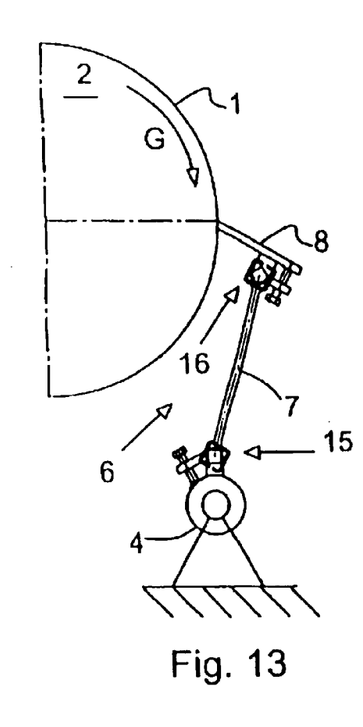
FIG. 13 is a view similar to the one shown in FIGS. 10–12, however having a rotatable support of the system carrier.
Figure 14:
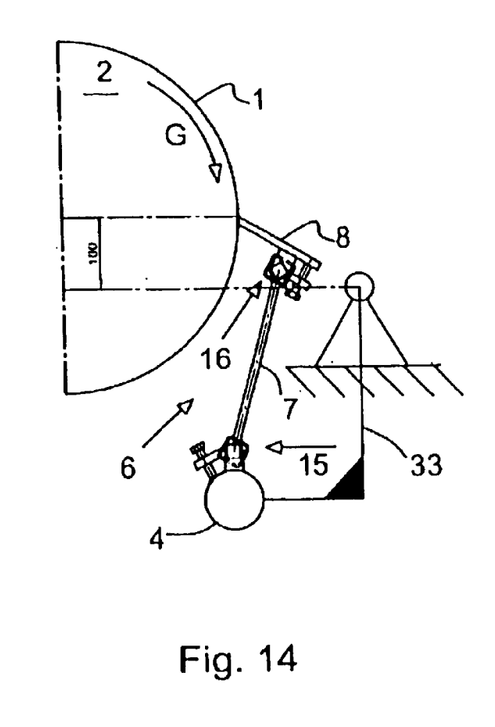
FIG. 14 is a view similar to the one shown in FIG. 13, however having a rotary axis of the support of the system carrier below the horizontal central plane of the pulley.
Figure 15:
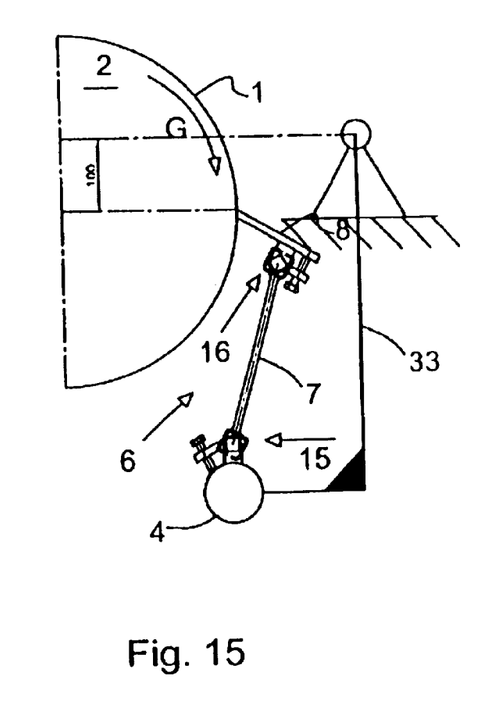
FIG. 15 is a view as in FIG. 14, however having a rotary axis of the support of the system carrier above the horizontal central plane of the pulley.

Examples of a rotatable support of the system carrier 4 for setting and pressing the stripping lamellae 8 of the lamella holders 7 of the system carrier 4 are each shown in the three o'clock position of the stripping lamellae 8 set in a peeling-off position in FIGS. 13 to 15. In FIG. 13, the system carrier 4 is arranged in an area below the pulley 2, the system carrier 4 becoming effective by being rotated or swivelled by a torque being applied to the system carrier 4 itself pneumatically, hydraulically or mechanically by means of tension, pressure or torsion springs or by weight forces or the like. In FIG. 14, according to a first alternative, a torque is effective below the horizontal centre axis of the pulley 2 and in FIG. 15 above the horizontal centre axis of pulley 2, in each case having a distance to this axis at both ends of the system carrier 4. In either case, the torque causes a swivelling motion of the system carrier 4 via rigid lateral supports 33 supporting the system carrier 4.

What is claimed is:

1. An apparatus for stripping off a belt in conveyor belt assemblies in the area of a drive and/or head pulley of the belt comprising a system carrier to be attached to a belt carrier frame, at least one stripping element arranged on the system carrier, the stripping element having a stripping lamella mounted on a lamella holder, the stripping lamella contacting the belt in a peeling position, and wherein the stripping element has a bottom swivel mount coupled to the lamella holder and having a swivel axis substantially parallel to a plane of the belt, spring means for pressing the stripping lamella on the lamella holder against the belt in such a form and arrangement that the lamella holder in the position of the stripping lamella is swivelled about the horizontal swivel axis in a spring loaded fashion, and when obstructions fast adhering to the belt, impact on the stripping lamella, the lamella holder deflects from and returns to a working position relative to the belt, and wherein the stripping lamella is swivel mounted at the lamella holder by a top swivel mount having a top swivel axis substantially parallel to a plane of the belt and is held by a top spring means in a spring biased fashion having spring action which is in a counter sense with respect to the spring means of the bottom swivel mount.

2. The apparatus according to claim 1, characterized in that at least one of the spring means acting on the lamella holder at the bottom swivel mount and the top spring means acting on the stripping lamella at the top swivel mount is a torsion spring.

3. The apparatus according to claim 1 or 2, characterized in that at least one of the top swivel mount and the bottom swivel mount is configured to be a torsion spring bearing.

4. The apparatus according to claim 2, characterized in that the torsion spring bearing comprises an internal square rod and a correspondingly inside square housing having spring elements in the corner areas defined between the internal square rod and the housing, for enlarging a maximum deflection angle consisting of at least two individual torsion springs coupled in series, so that an overall resulting deflection angle of the torsion spring bearing corresponds to a sum of the deflection angles of the individual torsion springs.

5. The apparatus according to claim 4, characterized in that of three individual torsion springs formed side by side on a continuous internal square rod having separate housings and spring elements, a torsion spring is created, wherein two lateral housings are coupled in a torsion resistant manner and form one end of the double spring while a middle housing is the other end of the double spring.

6. The apparatus according to claim 5, characterized in that one arm of the lamella holder via which a connection is made between the bottom and the top torsion spring bearing has at least one of:

a top end attached to the middle housing of the top torsion spring bearing configured as a double spring, and a bottom end coupled to the middle housing of the bottom torsion spring bearing configured as a double spring, while the two lateral housings are each commonly attached to a respective one of the stripping lamella and to a foot of the bottom torsion bearing.

7. The apparatus according to claim 1, characterized in that an effective line of a stripping edge of the stripping lamella in the stripping position of the stripping lamella at the belt extends in a bottom 90° sector defined between the horizontal and the vertical centre planes of the contact angle of the belt on a pulley.

8. The apparatus according to claim 1, characterized in that an attack angle of the stripping lamella in the stripping position at the belt is between about 40° and about 80° with respect to a tangent to a radius of the angle of contact of the belt at the pulley in the point of the effective line of the stripping edge of the stripping lamella.

9. The apparatus according to claim 8, characterized in that the axis of the bottom swivel mount on the pulley side of the tangent to the radius of the angle of contact of the belt at the pulley is in the point of the effective line of the stripping edge of the stripping lamella, and the axis of the top swivel mount is on the side of the tangent facing away from the pulley.

10. The apparatus according to claim 9, characterized in that the axis of the bottom swivel mount is on or close to the tangent.

11. The apparatus according to claim 1, characterized in that a distance between the top and the bottom swivel mounts is chosen sufficiently great that the angle for the biasing amount of the spring means associated with the bottom swivel mount and the angle of a deflection path of the lamella holder about the bottom swivel axis with obstructions impacting on the stripping lamella are together in the range of between 40° and 80°.

12. The apparatus according to claim 1, characterized in that the stripping position of the stripping lamella is adjustable to provide a desired attack angle of the stripping lamella on the lamella holder and to provide a right bias of the associated spring means, and is fixed by means of an adjustable screw.

13. The apparatus according to claim 1, characterized in that the biasing force of the spring means associated with the bottom swivel mount is adjusted by suitably swiveling the lamella holder about a necessary biasing amount and fixing of the lamella holder in the biased position.

14. The apparatus according to claim 1, characterized in that setting of the stripping lamellae in the stripping position at the belt is carried out by accordingly swiveling the lamella holder of the stripping elements about the swivel mount accompanied by biasing the associated spring means by the system carrier.

15. The apparatus according to claim 14, characterized in that the adjustment and biasing of the lamella holders may be carried out by shifting the system carrier.

16. The apparatus according to claim 15, characterized in that a shifting of the system carrier in a horizontal direction in the case of an effective line of the stripping lamella is in particular in the three o'clock position.

17. The apparatus according to any one of claims 14–16, characterized in that the system carrier is carried at both ends directly in horizontally shifting bearings.

18. The apparatus according to any one of claims 14–16, characterized in that the system carrier is attached to rigid supports at both ends, each supported by bearings arranged centrally in the area of the horizontal axis of the pulley and in horizontally shifting bearings on both ends of the system carrier and supported in horizontally shifting bearings.

19. The apparatus according to any one of claims 14–16, characterized in that the system carrier is attached to rigid supports at both ends, the supports being horizontally shiftable by means of bearings (32) each being arranged above the horizontal axis of the pulley.

20. The apparatus according to claim 14, characterized in that the system carrier is arranged in an area below the effective line of the stripping lamella and the adjustment of the system carrier is done by rotating of the same by having a torque act on at least one of the system carrier and its swiveling bearing.

21. The apparatus according to claim 20, characterized in that the torque is generated at least one of pneumatically, hydraulically and mechanically by means of at least one of tension, pressure and torsion springs and weight forces.

22. The apparatus according to any one of claims 14, 20 and 21 characterized in that the torque is generated coaxially between the system carrier and the lateral bearings of the system carrier.

23. The apparatus according to any one of claims 14, 20 and 21 characterized in that the torque is generated in bearings below or above the horizontal centre axis of the pulley and each at a distance to this axis, at both ends of the system carrier, and the torque causes, via rigid lateral supports carrying the system carrier, a swivel movement of the system carrier.

24. The apparatus according to claim 3, wherein the torsion spring bearing is a rubber torsion spring bearing.

25. The apparatus according to claim 7, wherein the stripping edge in the stripping position is in a three o'clock position.

26. The apparatus according to claim 8, wherein the attack angle is about 60°.

27. The apparatus according to claim 11, wherein the distance is chosen such that the angle for the biasing amount is about 65°.

* * * * *